United States Patent
Beacken et al.

[19]

[11] Patent Number: 6,072,536
[45] Date of Patent: Jun. 6, 2000

[54] METHOD AND APPARATUS FOR GENERATING A COMPOSITE IMAGE FROM INDIVIDUAL COMPRESSED IMAGES

[75] Inventors: Marc Jay Beacken, Randolph Township, Morris County; Robert L. Doran, Mt. Olive Township, Morris County, both of N.J.; Paul S. Giangrossi, New York, N.Y.; Paul R. Gloudemans, Flanders; Elizabeth A. Seip, Somerville, both of N.J.

[73] Assignee: Lucent Technologies Inc., Murray Hill, N.J.

[21] Appl. No.: 08/959,580

[22] Filed: Oct. 29, 1997

[51] Int. Cl.$^7$ ........................................................ H04N 9/74
[52] U.S. Cl. ........................... 348/584; 348/588; 348/598; 348/600; 348/383
[58] Field of Search ................................. 348/383, 584, 348/588, 589, 598, 599, 600, 420, 421; 382/232, 235, 239, 245, 246, 247, 250; H04N 9/74, 9/76

[56] References Cited

U.S. PATENT DOCUMENTS

| | | | |
|---|---|---|---|
| 5,650,861 | 7/1997 | Nakajima | 358/433 |
| 5,867,598 | 2/1999 | De Queiroz | 382/235 |
| 5,875,039 | 2/1999 | Ohsawa | 358/435 |
| 5,905,813 | 5/1999 | Terane | 382/239 |

*Primary Examiner*—Sherrie Hsia

[57] ABSTRACT

A composite image generator for generating a multi-image composite from a plurality of individual compressed images is disclosed. Multi-image composites are generated from static images or from a video stream with significantly reduced computation, reduced latency for video processing and reduced storage requirements. The individual images may be compressed with a JPEG image encoder or another suitable intraframe image encoder, such as those implementing the MPEG-II standard. In the illustrative embodiment, four (4) individual images of equal size, compressed using the JPEG standard, are combined into a multi-image composite with a single individual image in each quadrant of the composite image. Multi-image composites are created without fully decoding each individual compressed image, by partially decoding the individual compressed images and only fully decoding a small portion of each image. Multi-image composites are created from N individual compressed images by initially decoding the data of the N compressed images only enough to identify where each row of 8×8 blocks end, so that the image data may be reordered in an appropriate manner. As each 8×8 block is detected, the input image data is copied to the output image data to create the multi-image composite. The desired composite configuration determines the order of processing the N input images. Since each codeword may encode more than one coefficient, and each codeword may be of variable length, detection tables preferably indicate the number of bits encapsulated in each codeword and the number of coefficients represented by these bits. As the input image data is evaluated, the number of coefficients may be counted until all of the coefficients in a block have been processed, or until an end-of-block codeword is detected. The DC difference values at the border of each individual image must be recalculated to reflect the reordering of the pixels, since the DC coefficient in each block is encoded relative to the DC coefficient from the previous block, which will be different for certain blocks in the reordered multi-image composite image.

29 Claims, 8 Drawing Sheets

| CATEGORY | DC DIFFERENCE VALUES / AC COEFFICIENTS | | | | |
|---|---|---|---|---|---|
| 0 | | | 0 | | |
| 1 | | -1 | | 1 | |
| 2 | | -3 | -2 | 2 | 3 |
| 3 | -7 | ... | -4 | 4 | ... |
| 4 | -15 | ... | -8 | 8 | ... |
| 5 | -31 | ... | -16 | 16 | ... |
| 6 | -63 | ... | -32 | 32 | ... |
| 7 | -127 | ... | -64 | 64 | ... |
| 8 | -255 | ... | -128 | 128 | ... |
| 9 | -511 | ... | -256 | 256 | ... |
| 10 | -1023 | ... | -512 | 512 | ... |
| 11 | -2047 | ... | -1024 | 1024 | ... |
| 12 | -4095 | ... | -2048 | 2048 | ... |
| 13 | -8191 | ... | -4096 | 4096 | ... |
| 14 | -16383 | ... | -8192 | 8192 | ... |
| 15 | -32767 | ... | -16384 | 16384 | ... |
| 16 | | | 32768 | | |

DC DETECTION TABLE

| LOOKUP CODE (HEX) | LUMINANCE DC DIFFERENCE CATEGORY/CODE LENGTH | CHROMINANCE DC DIFFERENCE CATEGORY/CODE LENGTH |
|---|---|---|
| 00 | 0/2 | 0/2 |
| 01 | 0/2 | 0/2 |
| 02 | 0/2 | 0/2 |
| ... | ... | ... |
| FE | 10/18 | 8/16 |
| FF | ESCAPE | ESCAPE |

AC ENCODING TABLE

| RUN / LENGTH | CODEWORD |
|---|---|
| 0/1 | 00 |
| 0/2 | 01 |
| 0/3 | 100 |
| 0/4 | 1011 |
| ... | ... |
| F/3 | 1111111111110111 |
| F/4 | 1111111111111000 |
| F/5 | 1111111111111001 |
| ... | ... |

AC DETECTION TABLE (600)

| LOOKUP CODE (HEX) | LUMINANCE RUN/LENGTH (HEX) | CHROMINANCE RUN/LENGTH (HEX) |
|---|---|---|
| 0000 | | |
| 0001 | | |
| 0002 | | |
| ... | ... | ... |
| E280 | 0306 | 010C |
| E281 | | |
| ... | ... | ... |
| FFFE | | |
| FFFF | | |

700 for quad=1,2,1,2,...,1,2,3,4,3,4,...,3,4
    // 15 rows alternating between quadrants 1 and 2,
    // then 15 rows between quadrants 3 and 4.
    Decode DC difference of Y block 1
    Compute and save DC value of Y block 1
    Re-compute and write out DC difference of Y block 1
    Detect 63 AC coefficients of Y block 1
    Decode DC difference of Y block 2
    Compute and save DC value of Y block 2
    Detect 63 AC coefficients of Y block 2
    Write out all decoded bits.
    Decode DC difference of Cb block 1
    Compute and save DC value of Cb block 1
    Re-compute and write out DC difference of Cb block 1
    Detect 63 AC coefficients of Cb block 1
    Write out all decoded bits.
    Decode DC difference of Cr block 1
    Compute and save DC value of Cr block 1
    Re-compute and write out DC difference of Cr block 1
    Detect 63 AC coefficients of Cb block 1
    Write out all decoded bits.

FIG. 7A for col = 2,...,20

Decode DC diff of Y block (col*2-1)

Detect 63 AC coefficients of Y block (col*2-1)

Decode DC diff of Y block (col*2)

Detect 63 AC coefficients of Y block (col*2)

Decode DC diff of Cb block (col)

Detect 63 AC coefficients of Cb block (col)

Decode DC diff of Cr block (col)

Detect 63 AC coefficients of Cr block (col)

Write out all decoded bits.

Save last decoded Y, Cr, Cb DC values

FIG. 7B

METHOD AND APPARATUS FOR GENERATING A COMPOSITE IMAGE FROM INDIVIDUAL COMPRESSED IMAGES

FIELD OF THE INVENTION

The present invention relates to image encoding techniques, and more particularly, to a method and apparatus for generating a composite image from a plurality of compressed images.

BACKGROUND OF THE INVENTION

Due to the limited bandwidth of transmission channels, there are a limited number of bits available for encoding image information, for example, associated with a video teleconference. Thus, there are many image encoding techniques available which encode the image information with as few bits as possible using compression techniques, while still maintaining the quality and intelligibility that are required for a given application.

Generally, to obtain a composite image from a plurality of individual images, hereinafter referred to as a "multi-image composite," the pixel values of the individual images are typically combined in a predetermined visual order. Generating a multi-image composite, however, becomes more difficult if one or more of the individual images is compressed, particularly if the resulting image must maintain the same format. Specifically, since image compression is serially dependent and of variable length, pixel boundaries are not readily apparent in a compressed image. In addition, since many encoding techniques exhibit intra-frame pixel dependencies, the pixel values must be modified when generating a multi-image composite to reflect the reordering of the pixels.

Typically, when combining one or more compressed images to form a multi-image composite, the individual images are initially decompressed into the pixel domain, before the pixel values are reordered to create the multi-image composite. Finally, the multi-image composite is compressed to form the final image. The more popular image compression techniques, such as JPEG and MPEG, typically perform three (3) steps to generate a compressed image, namely, (i) transformation, such as a discrete cosine transform (DCT); (ii) quantization; and (iii) run-length encoding (RLE). Likewise, to decompress images using these same image compression techniques, the inverse of the compression steps are performed by the receiver on the compressed image, namely, (i) run-length decode; (ii) dequantization; and (iii) inverse discreet cosine transform (IDCT). Thus, to create a multi-image composite from N images, using conventional techniques, requires N decompressions, pixel reordering and one compression.

As apparent from the above-described deficiencies with image composition techniques, a need exists for an improved method and apparatus for generating a composite image from a plurality of compressed images. A further need exists for a technique for generating a multi-image composite image from a plurality of compressed individual images, requiring a reduced number of computational steps. Yet another need exists for a technique for generating a multi-image composite image from a plurality of compressed individual images, which exhibits reduced latency for video processing and reduced storage requirements.

SUMMARY OF THE INVENTION

Generally, a composite image generator for generating a multi-image composite from a plurality of individual compressed images is disclosed. According to one aspect of the invention, multi-image composites are generated with significantly reduced computation, reduced latency for video processing and reduced storage requirements. Multi-image composites may be formed from static images or from a video stream. The individual images may be compressed with a JPEG image encoder or another suitable intraframe image encoder, such as those implementing the MPEG-II standard.

In the illustrative embodiment, four (4) individual images of equal size, compressed using the JPEG standard, are combined into a multi-image composite with a single individual image in each quadrant of the composite image. Multi-image composites are created in accordance with the present invention without fully decoding each individual compressed image, by partially decoding the individual compressed images and only fully decoding a small portion of each image. Generally, multi-image composites are created from N individual compressed images in accordance with the present invention by initially decoding the data of the N compressed images only enough to identify where each row of 8×8 blocks end, so that the image data may be reordered in an appropriate manner. As each 8×8 block is detected, the input image data is copied to the output image data to create the multi-image composite. The desired composite configuration determines the order of processing the N input images.

Image blocks are detected by evaluating the input image data to obtain the number of coefficients represented by each transmitted codeword, until a complete block is detected. Since each codeword may encode more than one coefficient, and each codeword may be of variable length, detection tables preferably indicate the number of bits encapsulated in each codeword and the number of coefficients represented by these bits. In this manner, as the input image data is evaluated, the number of coefficients may be counted until all of the coefficients in a block have been processed, or until an end-of-block codeword is detected.

The DC difference values at the border of each individual image must be recalculated to reflect the reordering of the pixels, since the DC coefficient in each block is encoded relative to the DC coefficient from the previous block, which will be different for certain blocks in the reordered multi-image composite image. For the illustrative multi-image composite, the DC difference values of the individual images change only on the left-most edge of each input image or quadrant. In other words, the DC difference values at the first column of each quadrant are recomputed using the DC difference value of the previous block (from the previous row of the previous quadrant). Thus, when an image border is detected, the composite image generator moves to the next image, while storing its place in the last image.

A more complete understanding of the present invention, as well as further features and advantages of the present invention, will be obtained by reference to the following detailed description and drawings.

DETAILED DESCRIPTION

Figure 1A:
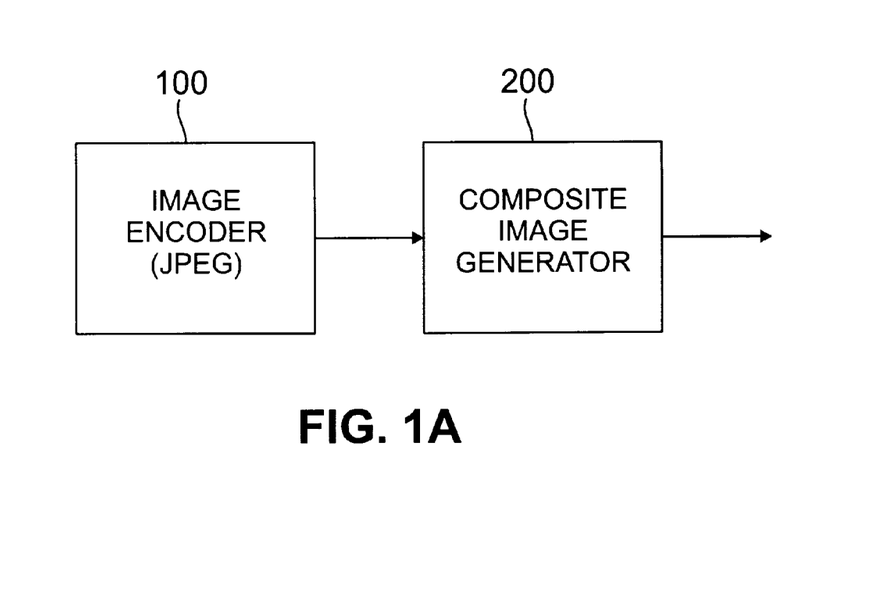
FIG. 1A is a schematic block diagram of a composite image generation system according to the present invention.

As shown in FIG. 1A, a composite image generator 200, discussed further below in conjunction with FIG. 2, generates a multi-image composite 150, shown in FIG. 1B, from a plurality of individual compressed images generated by one or more image encoders 100. According to a feature of the present invention, multi-image composites 150 are generated with significantly reduced computation, reduced latency (for video processing) and reduced storage requirements. In addition, frame insensitivity associated with the present invention permits multi-image composites to be formed from static images or from a video stream. Although the image encoder 100 is illustratively embodied as a JPEG image encoder, other suitable intraframe image encoders, such as those implementing the MPEG-II standard, may be utilized, as would be apparent to a person of ordinary skill.

In the illustrative JPEG embodiment, each input image consists of 15 rows and 20 columns of 8×8 pixel blocks. Each 8×8 pixel block contains 2 luminance (Y) macroblocks and 2 chrominance ($C_b$, $C_r$) macroblocks, with each macroblock containing 1 DC difference coefficient value, and 63 AC coefficient values. Thus, as shown in FIG. 1B, the illustrative multi-image composite 150 has 30 rows and 40 columns of 8×8 pixel blocks, where the first individual image 160 occupies columns 1 through 20, of the first 15 rows, the second individual image 170 occupies columns 21 through 40, of the first 15 rows, the third individual image 180 occupies columns 1 through 20, of rows 16 through 30, and the fourth individual image 190 occupies columns 21 through 40, of rows 16 through 30.

Figure 1B:
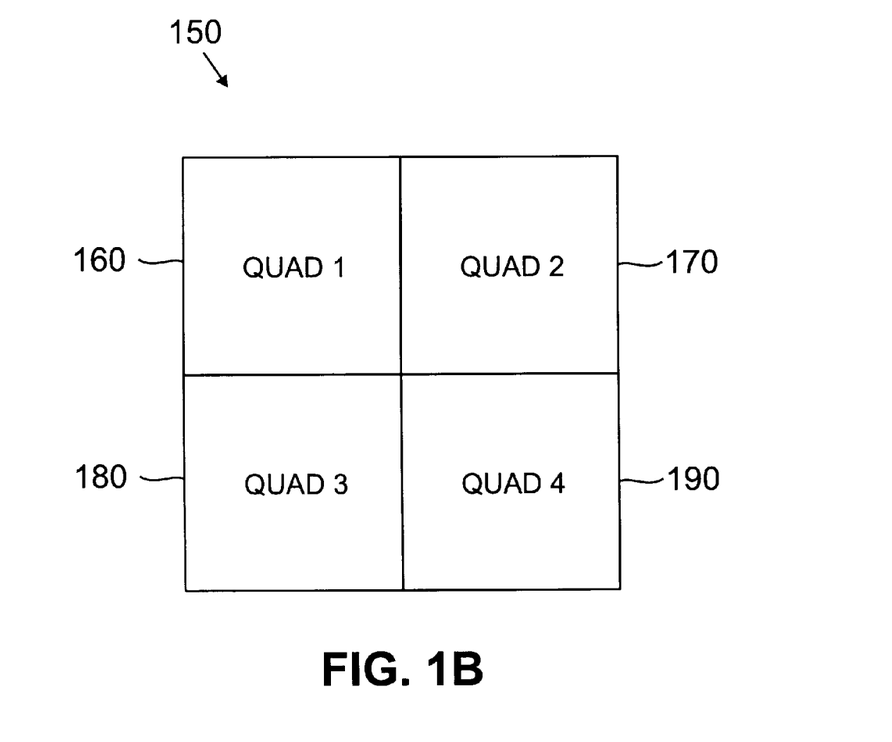
FIG. 1B is a graphical representation of an illustrative multi-image composite produced by the composite image generation system of FIG. 1A.

In the illustrative embodiment, shown in FIG. 1B, four (4) individual images of equal size, compressed using the JPEG standard, are combined into a multi-image composite 150 with a single individual image in each quadrant of the composite image 150. It is noted that the present invention may be extended to include overlapping images, or to otherwise create multi-image composites of any predetermined configuration, and to produce multi-image composites having added visual information, such as borders or icons.

Multi-image composites 150 are created in accordance with the present invention without fully decoding each individual compressed image, by partially decoding the individual compressed images and only fully decoding a small portion of each image. Generally, multi-image composites are created from N individual compressed images in accordance with the present invention by initially decoding the data of the N compressed images only enough to identify where each row of 8×8 blocks end, so that the image data may be reordered in an appropriate manner. As each 8×8 block is detected, the input image data is copied to the output image data to create the multi-image composite. The desired composite configuration determines the order of processing the N input images.

Figure 4:
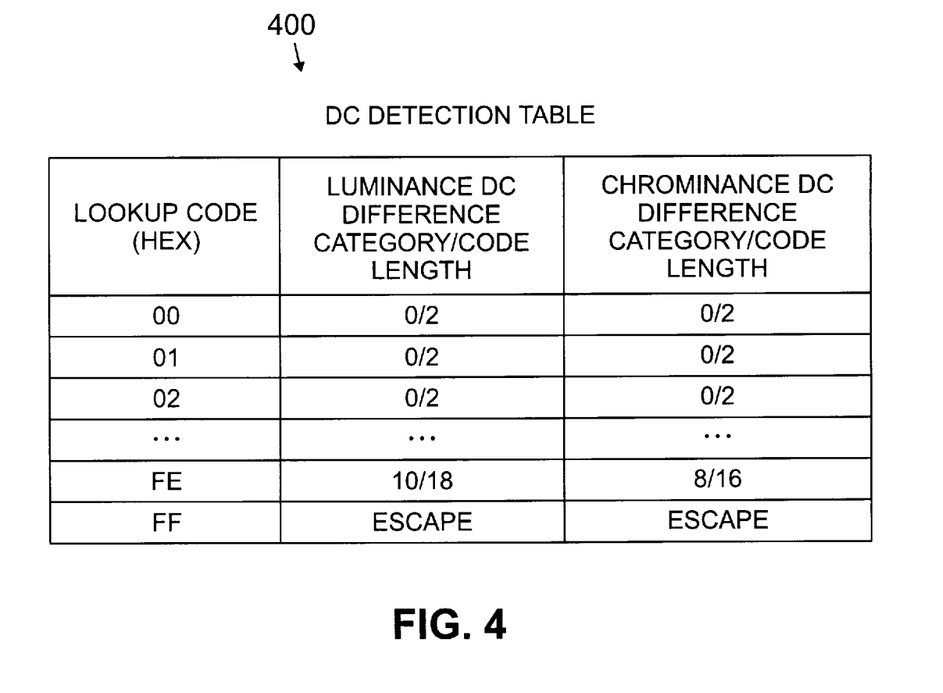
FIG. 4 illustrates the DC detection table of FIG. 2.

As discussed below in conjunction with FIGS. 4 and 6, each 8×8 block is detected by evaluating the input image data to obtain the number of coefficients represented by each transmitted codeword, until one (1) DC and sixty three (63) AC coefficients are detected. Since each codeword may encode more than one coefficient, for example, in a run-length encoded image, and each codeword may be of variable length, DC and AC detection tables 400, 600, shown in FIGS. 4 and 6, respectively, preferably indicate the number of bits encapsulated in each codeword and the number of coefficients represented by these bits. In this manner, as the input image data is evaluated, the number of coefficients may be counted until 63 AC coefficients have been processed, or until an end-of-block codeword is detected.

Furthermore, as discussed further below, the DC difference values at the border of each individual image must be recalculated to reflect the reordering of the pixels, since the DC coefficient in each 8×8 block is encoded relative to the DC coefficient from the previous block, which will be different for certain blocks in the reordered multi-image composite image 150. For the illustrative multi-image composite 150, the DC difference values of the individual images change only on the left-most edge of each input image or quadrant. In other words, the DC difference values at the first column of each quadrant are recomputed using the DC difference value of the previous block (from the previous row of the previous quadrant). Thus, when an image border is detected, the composite image generator 200 moves to the next image, while storing its place in the last image.

Figure 2:
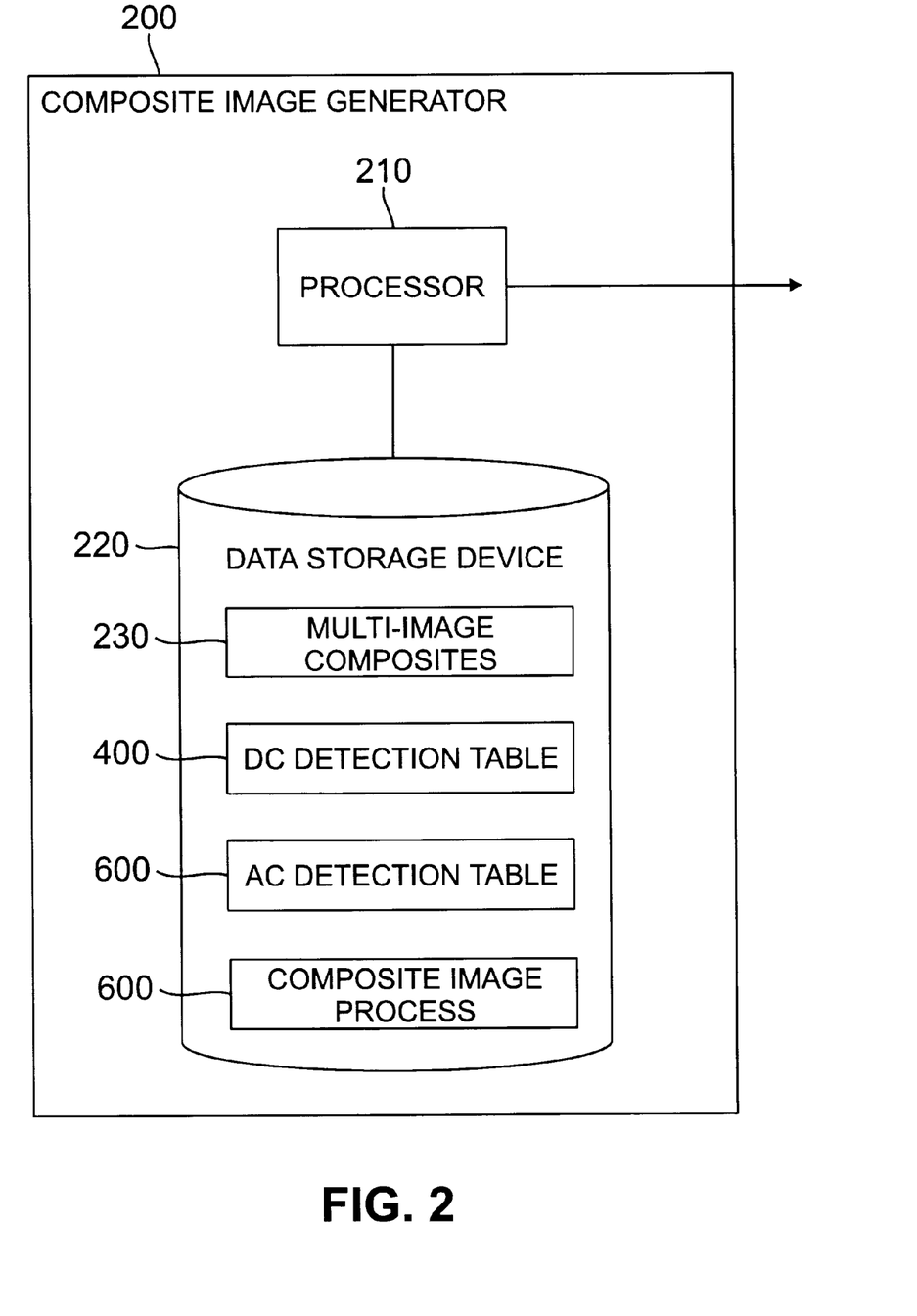
FIG. 2 illustrates the composite image generator of FIG. 1A.

FIG. 2 is a block diagram showing the architecture of an illustrative composite image generator 200. The composite image generator 200 preferably includes a processor 210 and related memory, such as a data storage device 220. The processor 210 may be embodied as a single processor, or a number of processors operating in parallel. The data storage device 220 and/or a read only memory (ROM) are operable to store one or more instructions, which the processor 210 is operable to retrieve, interpret and execute. The processor 210 preferably includes a control unit, an arithmetic logic unit (ALU), and a local memory storage device, such as, for example, an instruction cache or a plurality of registers, in a known manner. The control unit is operable to retrieve instructions from the data storage device 220 or ROM. The ALU is operable to perform a plurality of operations needed to carry out instructions. The local memory storage device is operable to provide high-speed storage used for storing temporary results and control information.

As discussed further below in conjunction with FIGS. 4 and 6, respectively, the data storage device 220 preferably includes an area of memory 230 for storing the multi-image composites, as well as the DC detection table 400 and the AC detection table 600. The DC detection table 400 and AC detection table 600 preferably store detection information for each codeword. In addition, as discussed further below in conjunction with FIG. 7, the data storage device 220 preferably includes a composite image process 700. Generally, the composite image process 700 (i) evaluates the input image data in an appropriate order to obtain the desired composite image configuration; (ii) decodes the data only enough to identify where each row of 8×8 blocks end; and (iii) recomputes the DC difference values at the first column of each row of each quadrant using the DC difference values of the previous block.

JPEG ENCODING

Under the JPEG standard, the AC and DC coefficients are coded differently. For a detailed discussion of JPEG encoding, see William B. Pennebaker and Joan L. Mitchell, JPEG Still Image Data Compression Standard (Ban Nostrand Reinhold, 1993), incorporated by reference herein.

Generally, the DC coefficient is a multiple of the average value in the 8×8 block. Since the average pixel value in any 8×8 block will not differ substantially from the average value in a neighboring block, the DC coefficient values will typically not vary significantly. Thus, in order to achieve further bit rate reductions in the JPEG standard, the differences between adjoining labels are encoded rather than the labels themselves.

Figure 3:
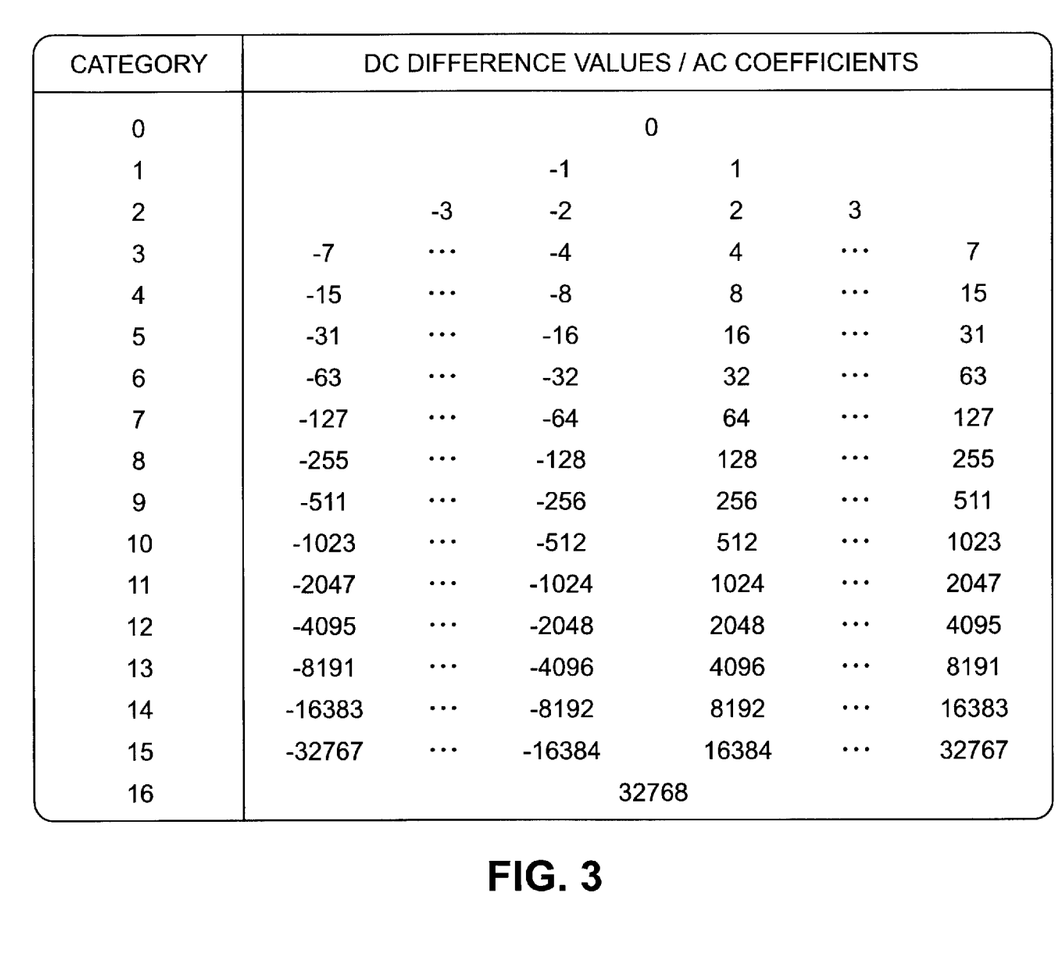
FIG. 3 illustrates the various categories utilized to encode the coefficient values under the JPEG standard.

In addition, the possible values that the encoded DC difference values can take in the JPEG standard are partitioned into categories, shown in FIG. 3. As shown in FIG. 3, the number of elements within each category grows by a power of two. For example, category 0 has only one member, category 1 has two members and category 2 has four members. The category numbers are then Huffman coded. The particular element within each category is specified by adding additional bits to the end of the Huffman code for a given category. Since category 1 has two members, it can be differentiated using one additional bit. In general, category n has $2^n$ members and can be differentiated using n additional bits.

For example, category 3 has eight values {−7, −6, −5, −4, 4, 5, 6, 7}. Thus, if the DC difference values between two adjacent blocks is 5, the Huffman code for category 3 is transmitted, as well as three bits to differentiate which of the eight values in category 3 was transmitted. Thus, in order for the receiver to decode the transmitted information, a DC decode table 400, shown in FIG. 4, is typically accessed. As shown in FIG. 4, data is read in eight bit chunks, and the DC detection information provided in FIG. 4 indicates the number of additional bits to read to derive the particular element within the identified category. In this manner, the DC difference value is obtained. According to a feature of the present invention, discussed further below in conjunction with FIG. 4, the DC difference values of each block in each individual compressed image are decoded using the decode table 400 before generating the multi-image composite, so that the DC difference values at the border of each individual image may be recalculated to reflect the reordering of the pixels, in the manner described above.

Figure 5:
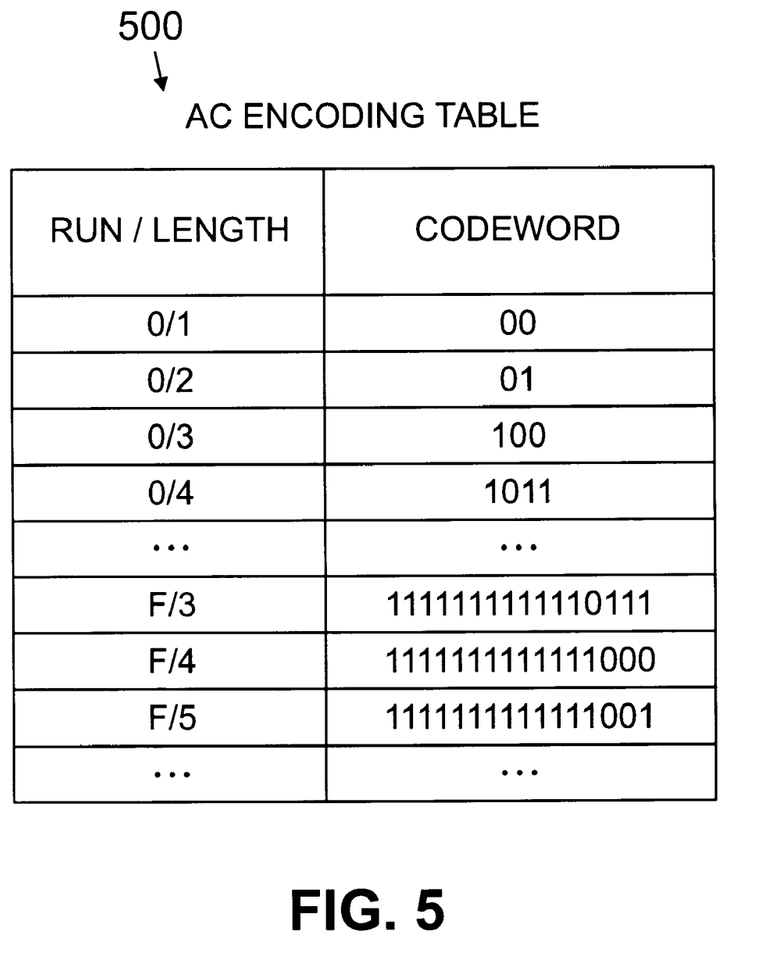
FIG. 5 illustrates an AC encoding table in accordance with the JPEG standard.

Due to the quantization and thresholding performed on the transformed values, many of the AC coefficients are zero. Thus, the JPEG standard achieves significant further bit rate reductions by implementing run-length encoding on the AC coefficients. Thus, in addition to encoding a category, as well as the additional bits to differentiate a particular member within a given category, in a similar manner to the DC difference values discussed above, the number of non-zero AC coefficients since the last non-zero coefficient is also encoded. As shown in FIG. 5, the category of the non-zero coefficient to be encoded, and the "run", or the number of zero coefficients preceding the current non-zero coefficient, form a pointer to a specific Huffman code. It is noted that since category n has $2^n$ members and can be differentiated using n additional bits, the category number indicates the number of additional bits. Thus, the Huffman code for a coefficient in category n is followed by n additional bits. The encoded information is therefore said to consist of a run/length, where the run is the number of coefficients having a zero value preceding the current non-zero coefficient, and the length is the number of additional bits to differentiate the particular member within a given category.

As previously indicated, the AC coefficients are only decoded enough to permit counting of the coefficients until 63 AC coefficients have been processed, or an end-of-block code has been detected. Thus, in order to generate the multi-image composite image 150 without fully decoding each codeword, an AC detection table 600, shown in FIG. 6, is utilized which returns detection information for each codeword. Since luminance and chrominance values are encoded differently and separately to take advantage of differences in human sensitivity to each, using an n-tuple representation of a color image, such as a 3-tuple representation consisting of one luminance (Y) image and 2 chrominance ($C_b, C_r$) images, the AC detection table 600 preferably maintains separate columns for each. The AC detection table 600 is derived from the AC encoding table 500, shown in FIG. 5, and translates each codeword in the input image into the number of coefficients encoded (the current coefficient plus preceding zero coefficients) and the total number of bits (number of bits in the codeword, plus the number of additional bits).

Figure 6:
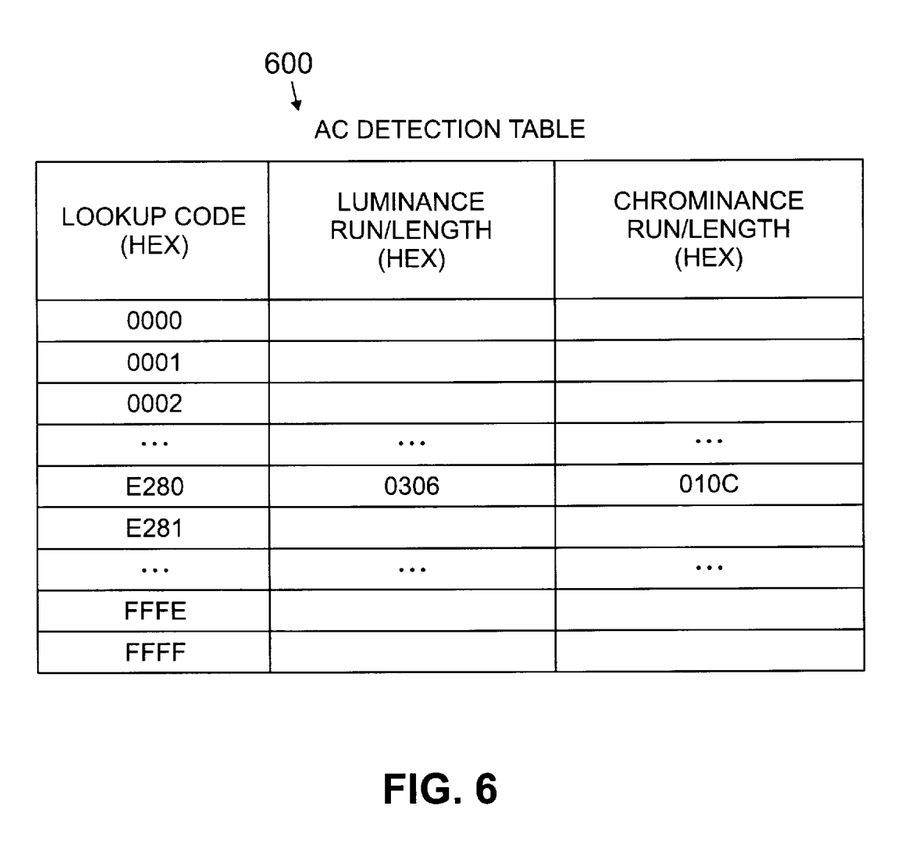
FIG. 6 illustrates the AC detection table of FIG. 2.
Figure 7A:
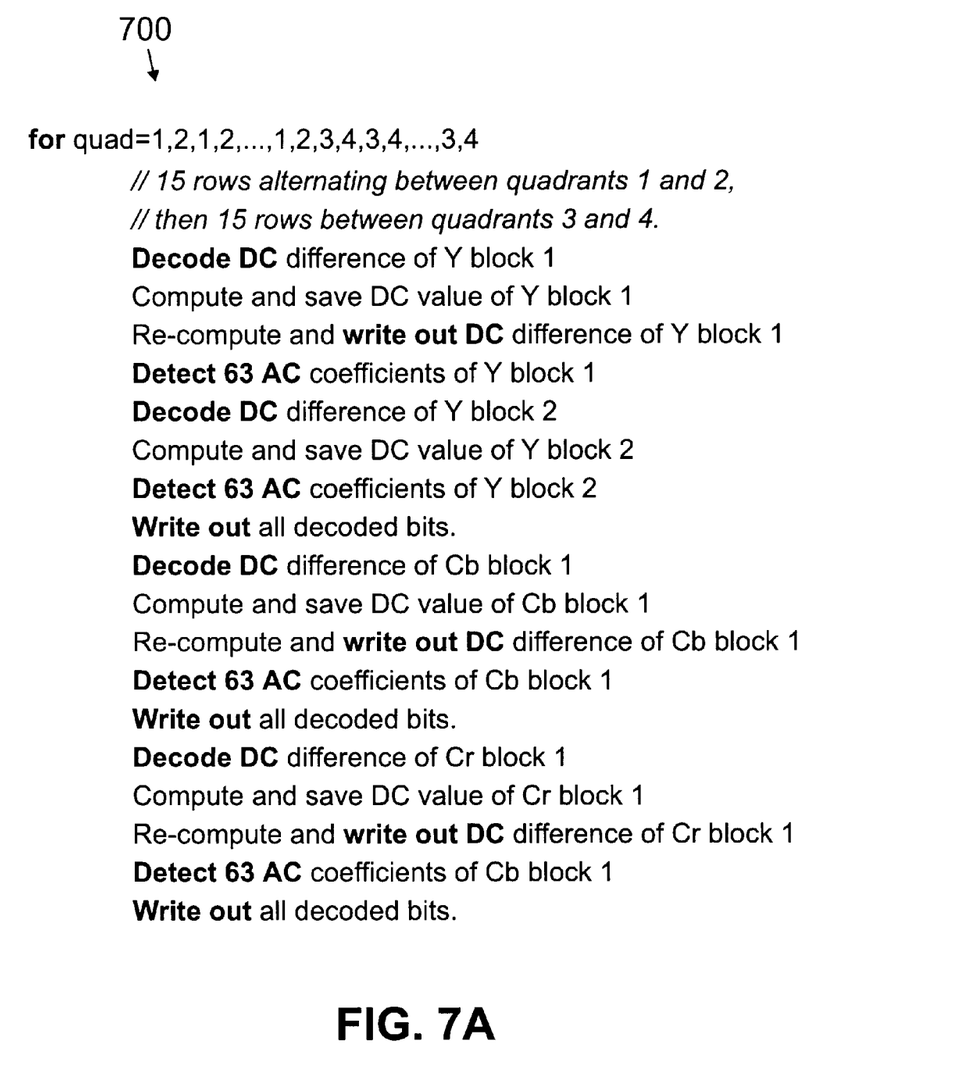
FIGS. 7A and 7B, collectively, are a flow chart describing an exemplary composite image process 700 of FIG. 2.
Figure 7B:
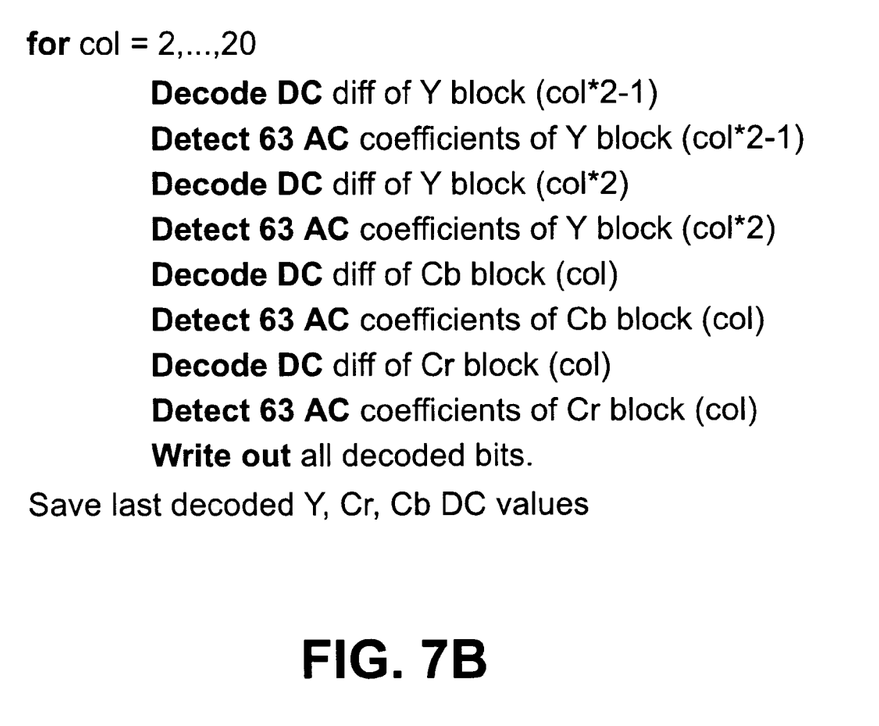

As shown in FIG. 6, 16-bit codes are utilized as an index into the AC detection table 600. Thus, there are 64K entries in the illustrative table 600. Each row consists of two (2) bytes of luminance detection information and two (2) bytes of chrominance detection information, in a hexadecimal notation. The upper byte of each two (2) bytes of detection information indicates the number of coefficients encoded (the current coefficient plus preceding zero coefficients) and the lower byte indicates the total number of bits (number of bits in the codeword, plus the number of additional bits). As discussed below in conjunction with FIG. 7, the number of coefficients encoded is utilized to increment a counter, until the total block of 63 AC coefficients has been processed. The total numbers of bit is utilized to shift the bits to the next codeword in the stream.

As discussed above, the composite image generator 200 preferably executes a composite image process 700, shown in FIGS. 7A and 7B, to (i) evaluate the input image data in an appropriate order to obtain the desired composite image configuration; (ii) decode the data only enough to identify where each row of 8×8 blocks ends; and (iii) recompute the DC difference values at the first column of each row of each quadrant using the DC difference values of the previous block. As illustrated in FIG. 7A, the composite image process 700 begins the processes embodying the principles of the present invention by first alternating between rows of image 160 for quadrant 1 and image 170 for quadrant 2, and then alternating between rows of image 180 for quadrant 3 and image 190 for quadrant 4.

The portion of the composite image process 700 shown in FIG. 7A processes the four (4) 8×8 macroblocks associated with the first column of each individual image 160–190. As discussed above, and shown in FIG. 7A, the DC difference values for the first column of each row of each quadrant are recomputed using the DC difference values of the previous block. FIG. 7B is associated with the four (4) 8×8 macroblocks associated with columns two through fifteen of each individual image 160–190.

It is to be understood that the embodiments and variations shown and described herein are merely illustrative of the principles of this invention and that various modifications may be implemented by those skilled in the art without departing from the scope and spirit of the invention.

We claim:

1. A method of generating a multi-image composite from a plurality of individual images, each of said images having a plurality of rows and columns of blocks of image data, said method comprising the steps of:

evaluating said image data in a predetermined order to obtain a desired configuration for said multi-image composite;

identifying each of said blocks in said image data, each of said blocks having a DC difference value; and recomputing said DC difference value for each block that follows a different block in said multi-image composite.

2. The method according to claim 1, wherein said recomputing step is performed for the first column of each row of each quadrant using the DC difference value of a previous block.

3. The method according to claim 1, wherein said multi-image composite consists of four individual images, with a single individual image in each quadrant of said multi-image composite.

4. The method according to claim 1, wherein said multi-image composite consists of a plurality of overlapping images.

5. The method according to claim 1, wherein said multi-image composite includes added visual information.

6. The method according to claim 1, wherein said individual images are compressed using an intraframe encoding technique.

7. The method according to claim 6, wherein said intraframe encoding technique is JPEG.

8. The method according to claim 6, wherein said intraframe encoding technique is MPEG-II.

9. The method according to claim 6, wherein said intraframe encoding technique is a DCT/entropy encoded compression technique.

10. The method according to claim 1, wherein said blocks are identified using a detection table which translates said image data into the number of coefficients encoded by said image data and the total number of bits required to encode said coefficients.

11. A method of generating a multi-image composite from a plurality of individual images, each of said images having a plurality of rows and columns of blocks of image data, said method comprising the steps of:

evaluating said image data in a predetermined order to obtain a desired configuration for said multi-image composite;

decoding said image data only enough to identify where each row of said blocks ends, each of said blocks having a DC difference value; and recomputing said DC difference value for the first column of each row of each of said individual images using the DC difference value of a previous block.

12. The method according to claim 11, wherein said multi-image composite consists of four individual images, with a single individual image in each quadrant of said multi-image composite.

13. The method according to claim 11, wherein said multi-image composite consists of a plurality of overlapping images.

14. The method according to claim 11, wherein said multi-image composite includes added visual information.

15. The method according to claim 11, wherein said individual images are compressed using an intraframe encoding technique.

16. The method according to claim 15, wherein said intraframe encoding technique is JPEG.

17. The method according to claim 15, wherein said intraframe encoding technique is MPEG-II.

18. The method according to claim 15, wherein said intraframe encoding technique is a DCT/entropy encoded compression technique.

19. The method according to claim 11, wherein said blocks are identified using a detection table which translates said image data into the number of coefficients encoded by said image data and the total number of bits required to encode said coefficients.

20. A composite image generator for generating a multi-image composite from a plurality of individual images, each of said images having a plurality of rows and columns of blocks of image data, said composite image generator comprising:

a data storage device for storing said multi-image composite;

a processor to:
(i) evaluate said image data in a predetermined order to obtain a desired configuration for said multi-image composite;
(ii) decode said image data only enough to identify where each row of said blocks ends, each of said blocks having a DC difference value; and
(iii) recompute said DC difference value for the first column of each row of each of said individual images using the DC difference value of a previous block.

21. The generator according to claim 20, wherein said multi-image composite consists of four individual images, with a single individual image in each quadrant of said multi-image composite.

22. The generator according to claim 20, wherein said multi-image composite consists of a plurality of overlapping images.

23. The generator according to claim 20, wherein said multi-image composite includes added visual information.

24. The generator according to claim 20, wherein said individual images are compressed using an intraframe encoding technique.

25. The generator according to claim 24, wherein said intraframe encoding technique is JPEG.

26. The generator according to claim 24, wherein said intraframe encoding technique is MPEG-II.

27. The method according to claim 24, wherein said intraframe encoding technique is a DCT/entropy encoded compression technique.

28. The generator according to claim 20, wherein said data storage device includes a detection table which translates said image data into the number of coefficients encoded by said image data and the total number of bits required to encode said coefficients.

29. The generator according to claim 20, wherein at least one of said individual images are compressed and said multi-image composite must maintain said compression.

* * * * *